United States Patent Office 3,478,218
Patented Nov. 11, 1969

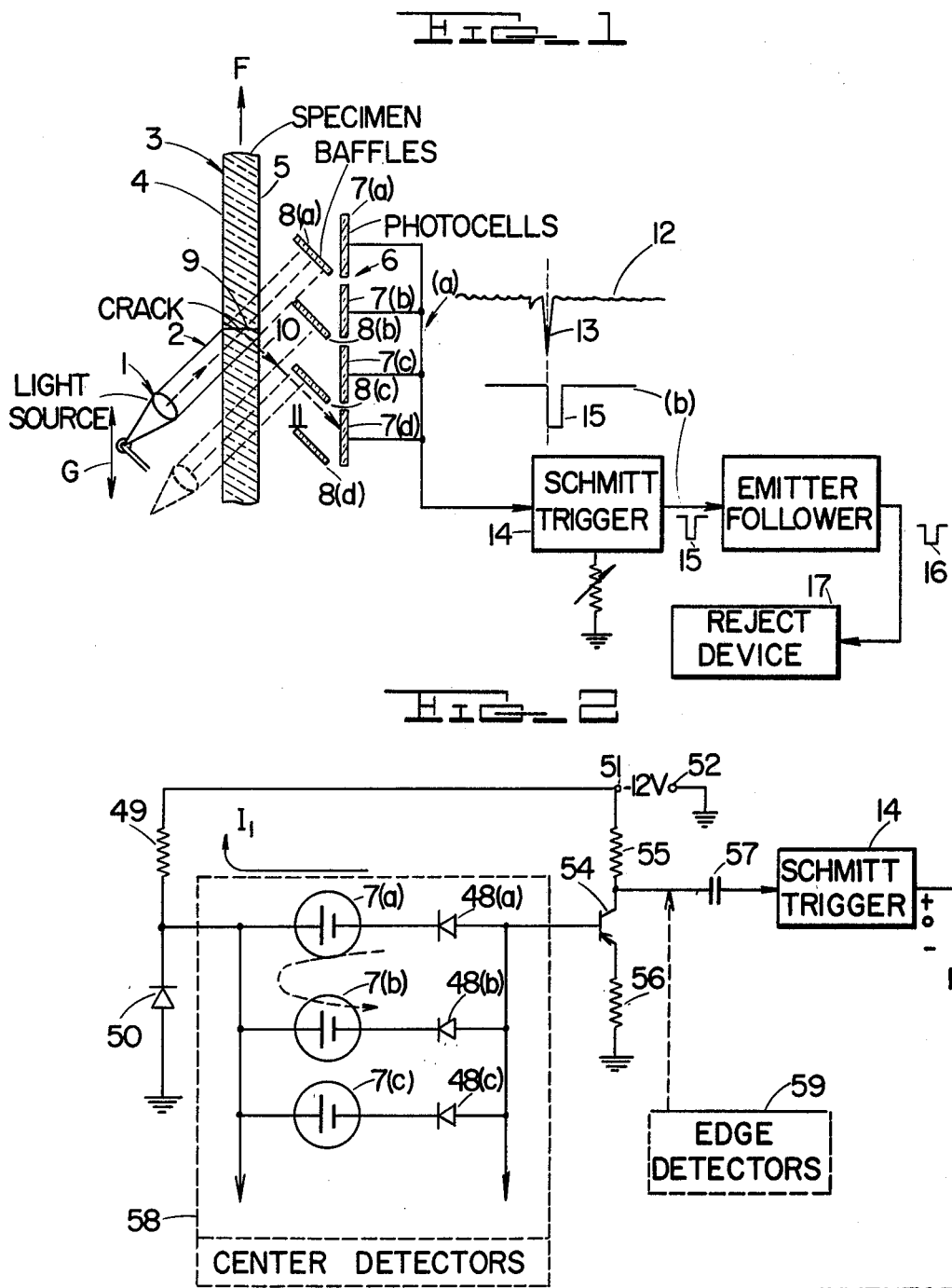

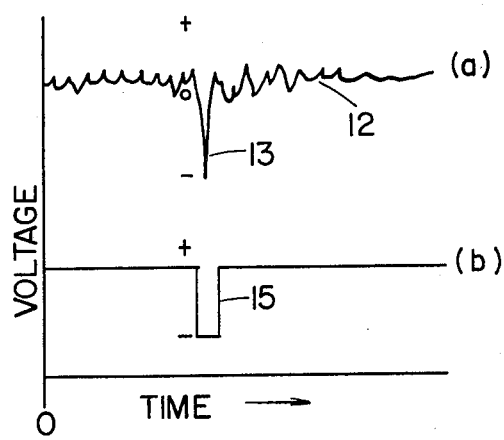
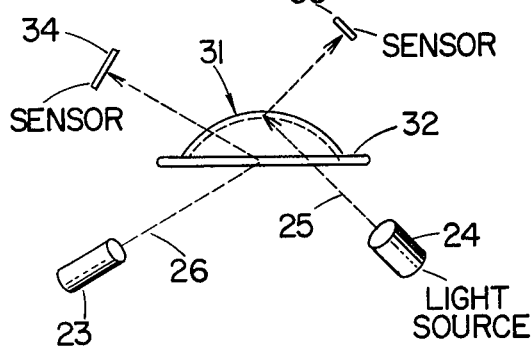
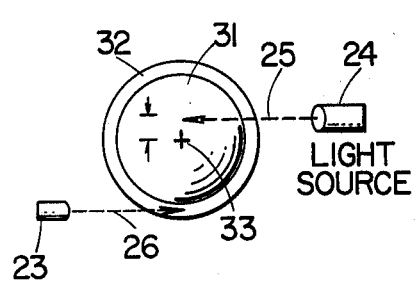

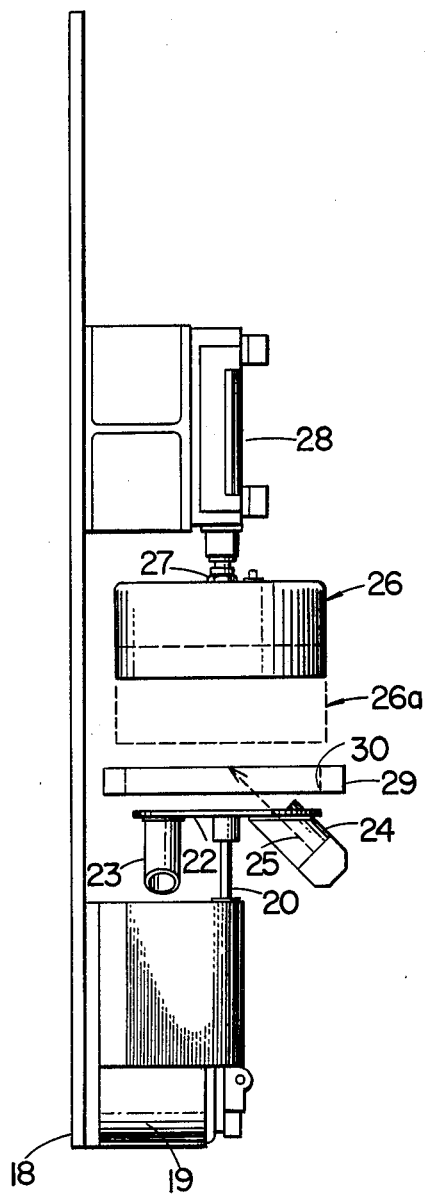
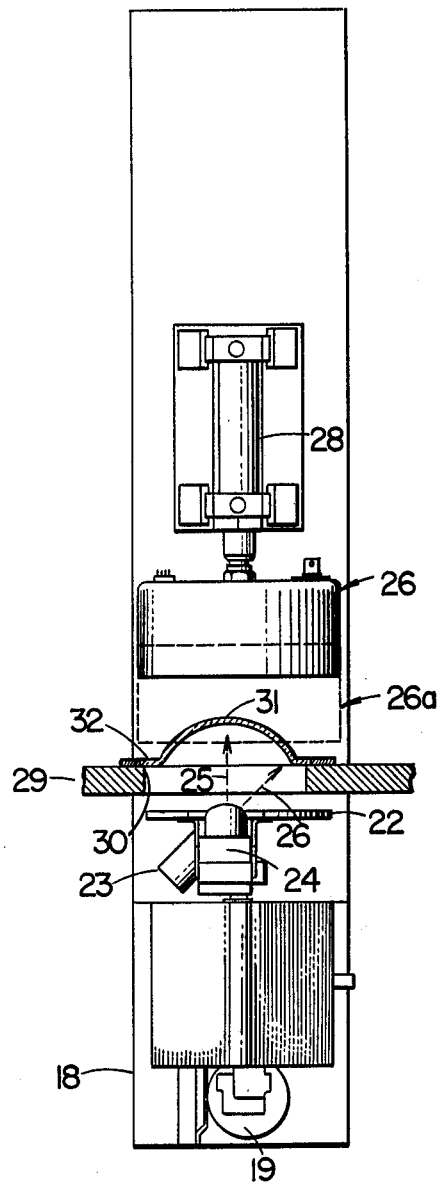

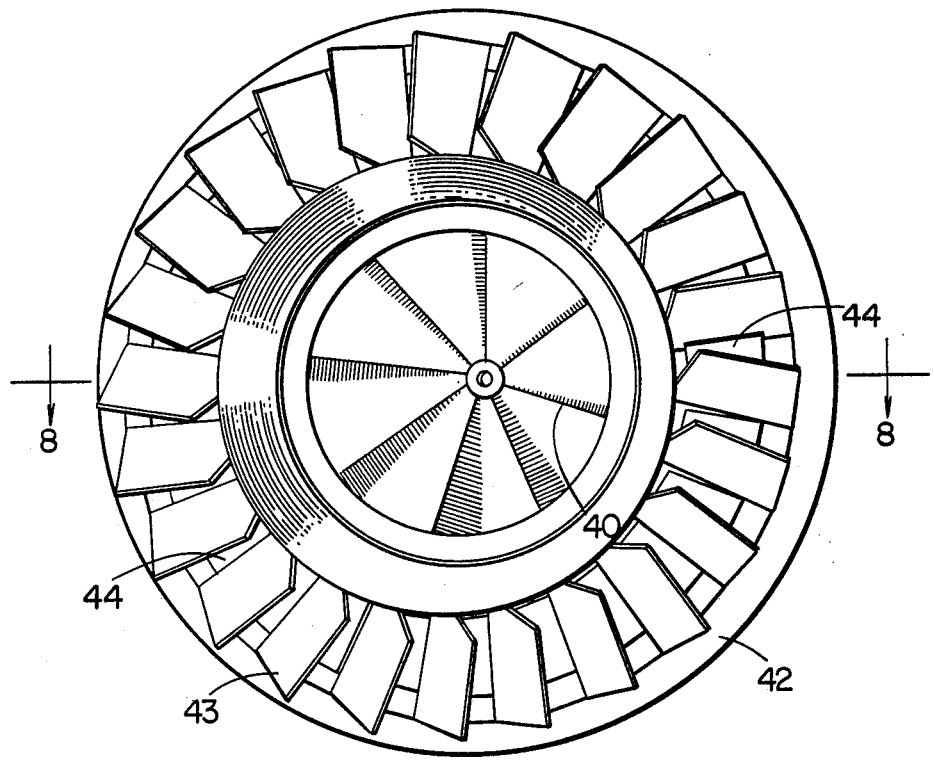

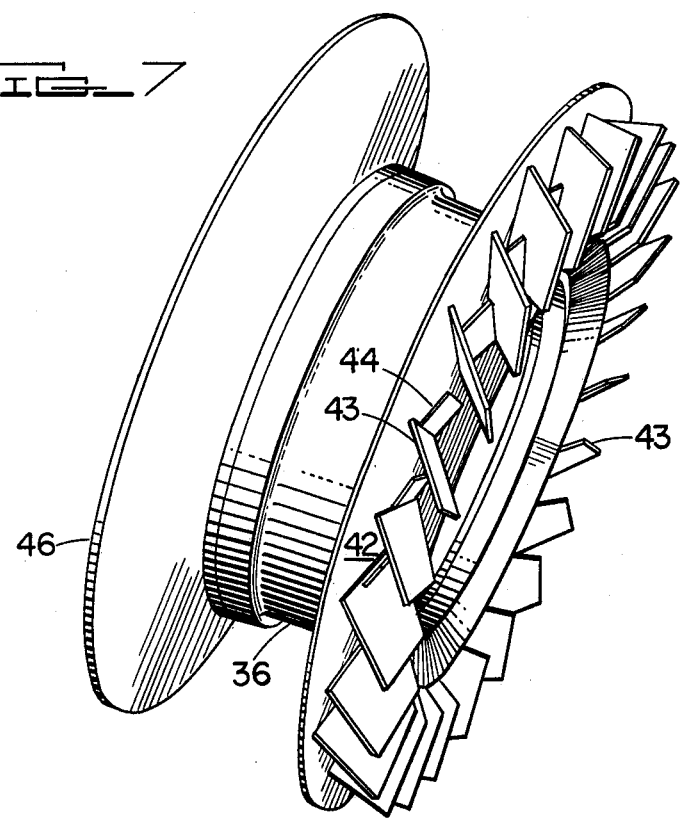
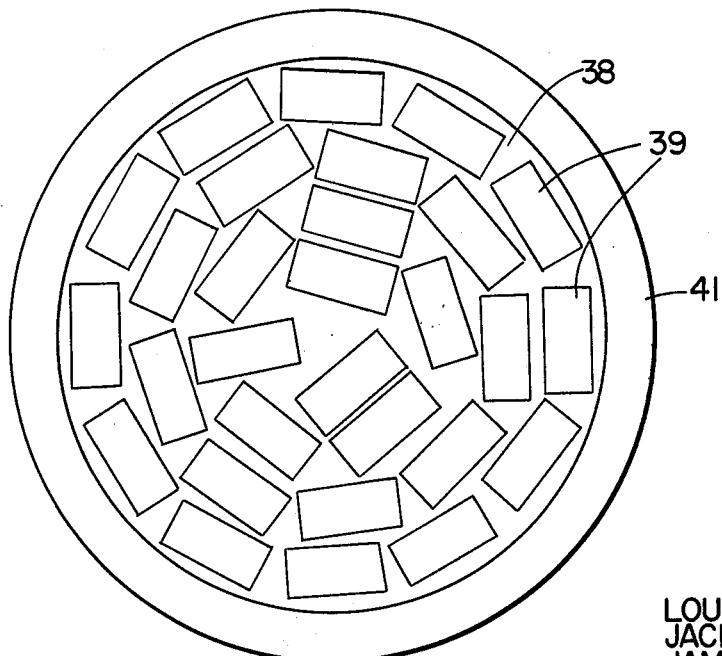

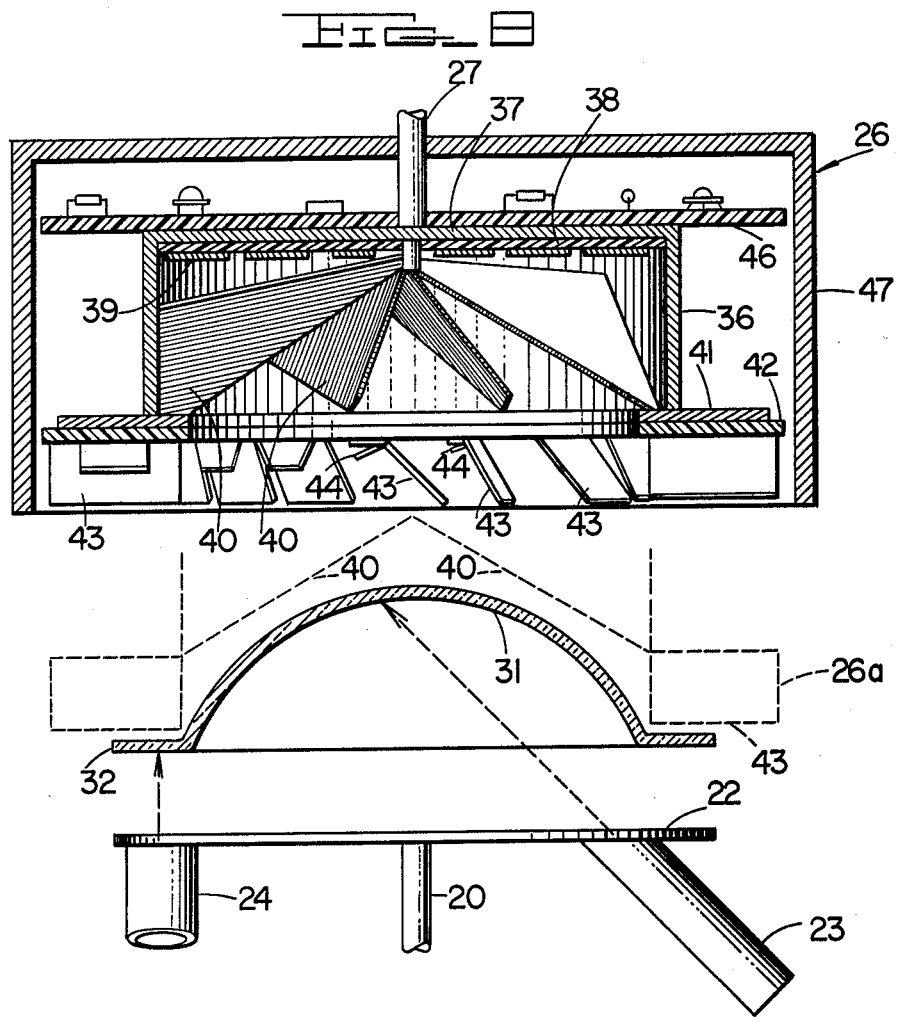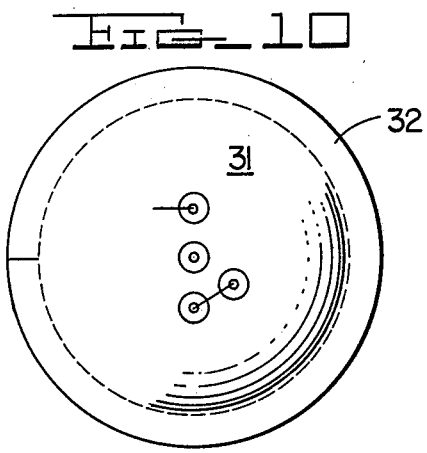

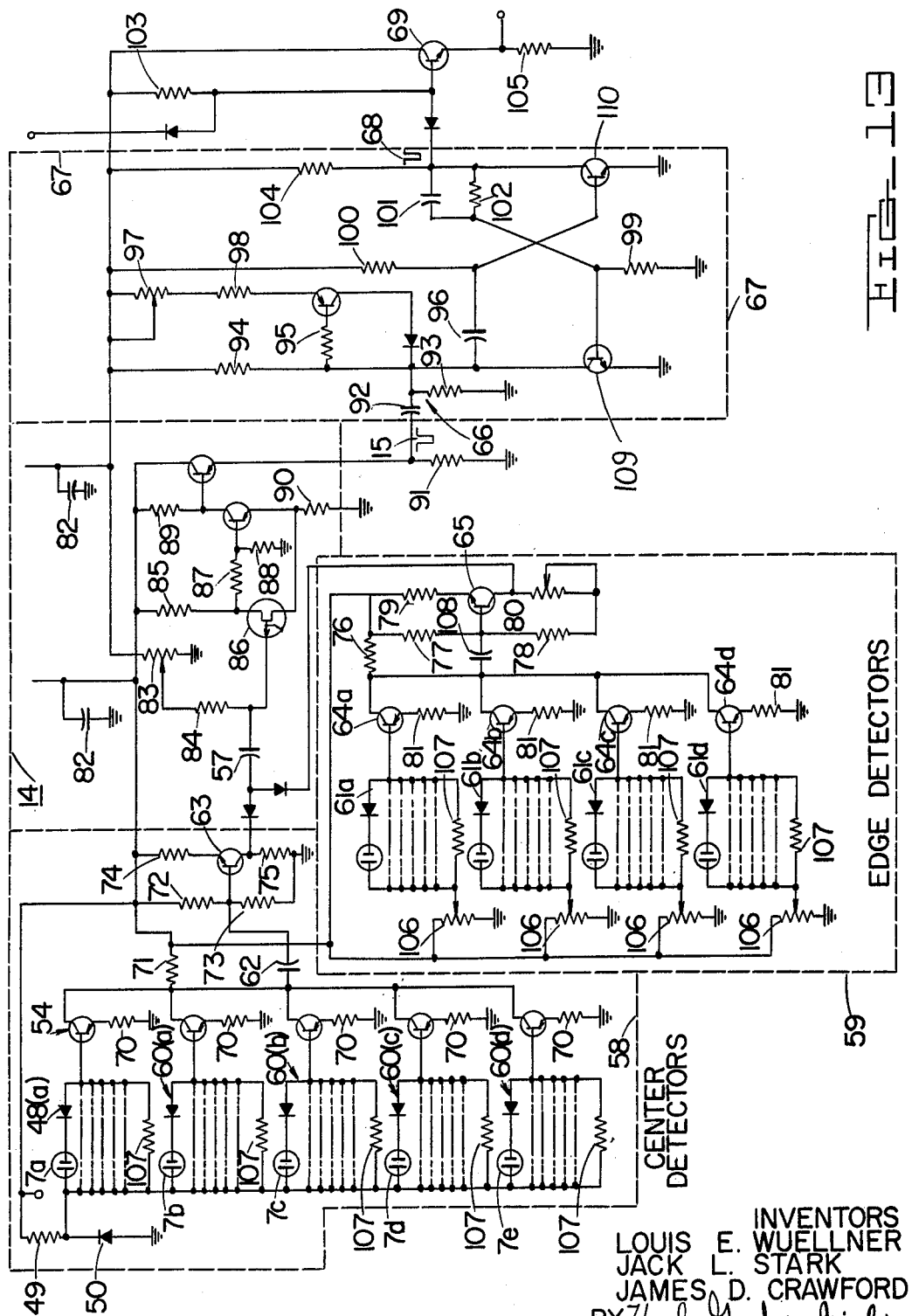

---

3,478,218
APPARATUS AND METHOD FOR DETECTING FLAWS IN ARTICLES OF GLASS AND THE LIKE
Louis E. Wuellner, Jack L. Stark, and James D. Crawford, Fort Wayne, Ind., assignors to International Telephone and Telegraph Corporation, Nutley, N.J., a corporation of Delaware
Filed Dec. 15, 1965, Ser. No. 524,958
Int. Cl. G01n 21/30
U.S. Cl. 250—219                                        9 Claims

ABSTRACT OF THE DISCLOSURE

A light beam is directed at an angle to a glass surface for detection of cracks therein by a sensor positioned out of the direct beam path. A light controlling device adjacent the sensor is positioned in the beam path to prevent direct impingement of light on the sensor while providing a passage for light reflected at a predetermined angle by a crack to impinge the sensor.

---

The present invention relates to an apparatus and method for detecting flaws in articles of glass and the like, and more particularly to an apparatus and method for detecting flaws such as cracks and the like in translucent and transparent articles, such as glassware.

In the manufacture of glass articles, particularly production molded articles such as bottles, dishware and the like, it is necessary to inspect the completed article to detect the presence of flaws such as cracks, processing defects and the like. In the past, time-consuming and thus costly visual inspection has been required to detect such flaws. It has therefore been considered desirable to provide flaw detection apparatus for eliminating the requirement for visual inspection and various forms of such apparatus have been proposed and used. In certain forms of such apparatus, light transmissivity of the article being tested has been utilized for the purpose of determining whether or not a flaw is present, such a flaw in the usual instance interfering with transmission. However, for molded glass objects such as dinnerware, automobile headlight lenses and reflectors, cracks therein which are substantially normal to the surfaces have been found to interfere inadequately with the transmission of light because of the smallness of the cross-section of the crack in comparison to the resolution capability of such inspection apparatus. Thus, the detection of such cracks by such means was found to be unreliable, hence unsatisfactory. It is therefore desirable to provide an apparatus and method capable of detecting with facility and reliability such cracks and similar defects.

It is, therefore, an object of this invention to provide an improved apparatus and method for detecting flaws in translucent and transparent articles of glass and the like.

Another object of this invention is to provide an apparatus and method which detects flaws by the use of light reflected therefrom.

In its broadest aspects, the apparatus includes first means for producing a light beam and directing the same in a predetermined straight path, and photosensor means located either in or close to said path for generating an electrical signal in response to radiation of said beam. Light-controlling means is interposed in the beam path between the first means and the photosensor for interrupting the beam and preventing the same from impinging on the sensor. This light-controlling means is unique in one respect that while it is substantially impermeable to light rays following the aforesaid straight-line path, yet it is permeable to rays directed at an angle to this path. An article of glassware to be tested, inserted between said first means and the light-controlling means, transmits light substantially along the aforementioned straight-line path. However, a crack in the article reflects light, and the apparatus is so arranged that the reflected light passes through the light-controlling means and impinges on the photosensor to excite the same. Thus, a crack in the article can be detected.

The method of this invention in its broadest aspects includes the steps of directing a beam of light along a predetermined path, disposing a glass article to be tested in the path of the beam, causing relative movement between the article and the beam, and detecting only that light reflected from cracks in the article as a consequence of the traversal of said beam thereover.

The above-mentioned and other features and objects of this invention and the manner of attaining them will become apparent and the invention itself will be best understood by reference to the following description of an embodiment of the invention taken in conjunction with the accompanying drawings, wherein:

FIG. 1 is a simplified schematic diagram which illustrates one embodiment of this invention;

FIG. 2 is a similar diagram of certain of the electronic components thereof;

FIG. 3 is a graph used in explaining certain of the operating principles of this invention;

FIG. 4 is a side elevation of an operating embodiment of this invention;

FIG. 5 is a front view thereof;

FIG. 6 is a perspective plan view of the photo-head assembly showing the annular arrangement of the light baffles;

FIG. 7 is a perspective view thereof;

FIG. 8 is a cross-section taken substantially along section line 8—8 of FIG. 6, but showing certain other parts of the apparatus in operating position with respect thereto;

FIG. 9 is a plan view of the central portion of the photohead assembly of FIG. 6 showing the arrangement of the photocells therein;

FIG. 10 is a top view of a typical automobile headlight reflector which is capable of being inspected by the apparatus and method of this invention;

FIGS. 11 and 12 are diagrammatic illustrations of this same reflector and the particular relationship between the light sources and the reflector; and FIG. 13 is a schematic diagram of the circuit portion of the working embodiment of this invention.

Referring to the drawings, and more particularly to FIGS. 1 and 2; a light source 1 in the form of a conventional, collimated light projector is set to direct a light beam along a straight-line path indicated generally by the reference numeral 2. A specimen 3 of transparent, plate-glass or the like is positioned as shown for movement in the direction of the arrow F (as will be explained later, either the projector 1 or both the projector and the specimen may be moved). The illustrated specimen 3 has opposite flat surfaces 4 and 5, the surface 4 being on the side facing the projector 1.

On the right-hand side of the specimen 3 is positioned a photosensor, indicated generally by the reference numeral 6, which preferably is composed of a series or array of individual photosensitive devices arranged in side-by-side relation. More particularly, these devices take the form of conventional silicon photovoltaic cells of flat configuration, these cells being indicated by the numeral 7 having suffix letters $a$, $b$ and $c$ as shown. In one embodiment, the cells 7 are arranged in a common plane, edge-to-edge and parallel to the surface 5 of the specimen 3.

A series of flat, baffle plates 8a, 8b, 8c and 8d are spaced apart in approximately parallel relation as shown, the spacing being approximately equal to the width dimension of the cells 7. The baffles are interposed substantially between the cells 7 and extend at an angle thereto as shown, such that any light being transmitted directly through the specimen 3 along the path 2 previously described will be intercepted and absorbed completely without reaching any of the photocells 7. On the other hand, the baffles 8 are set at such an angle that if a crack 9 through the thickness of the specimen 3 and substantially normal to the surfaces 4 and 5 should be positioned in the path 2 of the light beam, a certain portion of this light will be reflected along the dashed line 10, through the passageway 11 between, for example, two of the baffles 8d and 8c, and impinge on the photocell 7d.

At this point, it will be realized that the purpose of the baffles 8 is to prevent light which is directly transmitted through the glass specimen from impinging directly the photocells 7, but in the alternative to transmit reflected light from a flaw, crack or the like in the specimen onto one or more cells. Thus, the apparatus detects reflected light, this reflected light being used as the instrument for determining the presence of a flaw.

While it is possible to move the specimen 3 in the direction of the arrow F to bring a crack, such as crack 9, into registry with the beam 2, it is preferred to move the projector 1 in a direction such as that indicated by the double-ended arrow G without disturbing the angle or projection between the beam 2 and the stationary specimen 3. Thus, as the beam 2 traverses the crack 9, light will be reflected onto the cell 7d during the dwell time, thereby producing a change in the electrical characteristic of the cell. If this cell is photovoltaic, a voltage will be generated which can be utilized by reject circuitry for providing an indication of the flaw condition. More particularly, since it is impossible to eliminate background or spurious reflections from falling onto the various cells 7, even though no crack or flaw is present, a dynamic hash signal indicated by the numeral 12 may be obtained while scanning the projector 1 from the bottom of the specimen 3 to the top thereof. The spike 13 in this signal 12 indicates the presence of the crack 9 and illustrates the difference in amplitude between a signal produced by the crack and those generated by spurious reflections.

All of the cells 7 are connected into a common circuit which is coupled to a conventional Schmitt trigger 14 so adjusted as to respond only to a flaw signal, such as signal 13, to produce a single square pulse 15 in substantial time coincidence therewith. This signal 15 is then utilized by subsequent circuitry for providing a wider base reject signal 16 capable of operating a reject device 17, such as a conventional electro-mechanical relay, for performing a function which will indicate that the specimen 3 is defective.

Referring now to FIGS. 4 and 5, the mechanism of an operating embodiment of this invention will be described. Like numerals will indicate like parts. A stationary frame 18 has mounted thereon an electric motor 19 coupled by means of a suitable speed-reducing gear train to a vertical shaft 20. Carried on the upper end of this shaft 20 is a supporting disc 22 having mounted thereon two projection lamps 23 and 24, respectively, like the projectors 1 of FIG. 1. These two projectors 23 and 24 are conventional and are adapted to project upwardly in different directions collimated or slightly convergent beams. As shown more clearly in FIGS. 4 and 5, the projectors 23 and 24 are mounted on the disc 22 in such positions that the beam axes 25 and 26 thereof are at angles of about 45° with respect to the horizontal.

Coaxially positioned above disc 22 is a photo-head assembly 26. This assembly 26 is mounted on the lower end of a piston rod 27 of a double-acting air cylinder 28. In the full-line position of the photo-head 26, the cylinder 28 is at its uppermost position. When the latter is operated to project the piston rod 27 to its lowermost position, the head 26 is moved to the dashed line position 26a. It should be noted that there is a slight clearance provided between the bottom of the head 26 and the rotary disc 22 for a purpose which will be explained later on.

As more clearly shown in FIG. 4, the power cylinder 28 is rigidly mounted on the frame 18. Suitable valves and control mechanisms connected to the cylinder 28 serve in selectively operating the cylinder 28.

In the space between the photo-head 28 and the disc 22 is mounted a stationary article-supporting platform 29 having a circular opening 30 therein in coaxial registry with the disc 22. Inasmuch as this particular mechanism of FIGS. 4 and 5 is intended to check an article of glassware of particular configuration, this particular article will now be described. This article is a conventional reflector for an automobile headlight and consists of a dome or bowl-shaped part 31 having an annular flange 32. In FIGS. 5 and 10 are illustrated cross-sectional and plan views, respectively, thereof. The reflector 31, 32 is positioned on the platform 29 in the position shown in FIG. 5 so that it is centered over the disc 22 and the two projectors 23 and 24.

The particular positional relationship between the projectors 23 and 24 and the reflector 31, 32 is shown diagrammatically and more clearly in FIGS. 11 and 12. In FIG. 11 is a side view of the reflector illustrating the angulations of the two light beams with respect to the dome 31 and flange 32 portions of the reflector. As shown, the projector 23 is so positioned that in plan view as shown in FIG. 12 the axis 26 of the light beam is approximately tangent to the perimeter of the dome portion 31 but intersects at the flange 32 about the midportion thereof. Correspondingly, the projector 24 is aimed upwardly as shown in FIG. 11 to impinge the underside of the dome 31 to one side of the center 33 thereof. Reflected light from cracks is indicated as falling on sensors 34 and 35, respectively, this reflected light originating from cracks or similar type reflecting flaws in the reflector 31, 32 as explained hereinbefore.

The gear train which connects the motor 19 to the shaft 20 (referring again to FIGS. 4 and 5) is designed to rotate the shaft 20 at a speed of about two (2) revolutions per minute. Suitable electrical connections are made to the projectors 23 and 24 for energizing the same while the shaft 20 is rotating. Thus, while the shaft 20 rotates, the beam from the projector 23 will scan the underside of the flange 32 and similarly the beam from the projector 24 will scan a circular path on the underside of the dome 31. Mounted within the photo-head 26 is an array of photovoltaic cells and baffles adapted to receive only reflected light from the two projectors 23 and 24 for providing an indication of a flaw in the reflector 31, 32. The particular construction of this photo-head 26 will now be described.

Referring more particularly to FIGS. 6, 7, 8 and 9, the photohead assembly comprises a tubular frame 36 having an end plate 37 closing the upper end thereof as shown. Mounted on the underside of this end plate 37 is a suitable disc-shaped insulator 38, and on this insulator is mounted a multiplicity of flat silicon photovoltaic cells 39 arranged in a pattern substantially as shown in FIG. 9. These cells 39 are the same as the previously described cells 7 of FIG. 1 and are spaced apart so as to avoid any electrical-shorting connection therebetween.

Within the tubular frame 36 is mounted a series of radially oriented and circumferentially arranged baffle plates 40 spaced apart so as to provide light passages therebetween which terminate on one or more of the photovoltaic cells 39. These baffles 40 serve the same purpose as the baffles 8 previously described in connection with FIG. 1. These baffles may be made of flat thin gauge sheet metal or the like.

The baffles 40 are so angled that light transmitted in a straight line through the dome 31 of the reflector is intercepted and absorbed there by the baffles and is prevented from reaching the cells 39. However, the angles are such that the light reflected from a crack in the dome will pass between the baffles and strike certain of the cells 39. Desirably, the baffles are painted black so as to reduce reflection therefrom.

When viewed from the bottom end, as is shown in FIG. 6, only the baffles 40 can be seen, the cells 39 being hidden thereby.

Coaxially secured to the bottom end of the tubular frame 36 is an annular mounting flange 41 having a flat annular insulator of fiberglass or the like 42 secured thereto. Secured to the underside of the insulator 42 and depending therefrom is a multiplicity of baffle plates 43 circumferentially spaced apart as shown, these plates providing light passages therebetween which communicate with respective photovoltaic cells 44 secured in place adjacent to the insulator 42, there being one photocell 44 for each passageway. These baffles 43 are set at an angle such that any light transmitted in a straight line directly through the flange 32 will be intercepted and absorbed and prevented from falling upon the photocells 44. By the same token, these angles are such that any light reflected from a radial crack in the flange 32 will pass between the baffles 43 and impinge one or more photocells 44.

Again referring to FIG. 8, the relative positions between the photo-head 26, the reflector 31, 32 and the projector-supporting disc 22 are shown for both operating the non-operating positions. As shown in solid lines, the head 26 is retracted from the reflector 31, 32 and is in non-operating position. When moved downwardly to the dashed line position 26a by operating the power cylinder 28, the baffles 43 are immediately adjacent to the upper side of the flange 32, and the dome 31 is close to the baffles 40. The baffles 40 are angled from the center of the end cover 37 downwardly to the end of the tubular frame 36 so as to receive the dome 31 of the reflector in a position in which it will be immediately adjacent to the baffles 40. The individual baffles 40 are, therefore, of essentially triangular shape.

Electronic circuitry used in connection with the photocells 7, 39 and 44 (and shown in FIG. 13) may be of the printed circuit type and is indicated as being mounted on a board 46 of insulation positioned on top of the end cover 37. Over all of this mechanism is positioned a cylindrical housing 47 suitably attached to the piston rod 27.

The operation of the mechanism thus far described may now be explained. With a reflector 31, 32 mounted in position as shown in FIGS. 4 and 5, the disc 22 being rotated and the projectors 23 and 24 energized, the photohead 26 is lowered to the dashed line position 26a. If there are no cracks in the reflector 31, 32, the beams from the projectors 23 and 24 will be transmitted substantially in straight paths through the reflector and will fall on and be absorbed by the respective baffles 40 and 43. However, if there should be a radial crack in the dome portion 31, the light momentarily will be reflected from the crack backwardly between adjacent baffles 40 onto the photocells 39. These in turn produce an electrical signal representative thereof. Similarly, if there is a radial crack in the flange 32 of the reflector, light from the projector 23 will be reflected backwardly and will pass between the baffles 43 and fall on the photocells 44.

The electrical circuitry employed in this invention will now be described. Again, like numerals will indicate like parts. Referring to FIG. 2, the cells 7 are of the silicon voltaic type. These cells each are series-connected to diodes 48a, 48b, etc., all of the cell-diode combinations being connected in parallelism as shown. The positive terminals of the cells 7a, etc. are connected as show and the diodes 48a, etc. are connected to conduct circuit current in only the direction of the arrow $I_1$. This cell-diode circuit is back-biased by means of a voltage divider which includes a resistor 49 connected in series with a diode 50, this voltage divider connected between ground and the negative supply voltage terminal 51. The positive terminal 52 of the supply voltage is grounded as shown. Instead of using the particular voltage divider 49, 50, a variable resistor may be used instead.

The cell-diode circuit is also connected to the base of the transistor 54, the collector of the latter being connected via a load resistor 55 to the terminal 51. The emitter of the same transistor 54 is connected by means of a biasing resistor 56 to ground. The voltages applied to the transistor 54 are arranged such that when the cells 7a, 7b, 7c, etc. are submerged in darkness, the transistor 54 will be substantially nonconductive. On the other hand, when at least one of the cells is exposed to radiation, and develops a voltage, the transistor 54 is rendered conductive and amplifies the cell-produced signal.

Assuming, as previously described, that a given projector 1, 23, 24 is being scanned over a crack in the glass article, a pulse corresponding to the one indicated by the numeral 13 in FIGS. 1 and 3 will be produced by the particular cells 7a, 7b, 7c in question and the transistor 54 will amplify this signal in the same form. This same signal coupled via capacitor 57 to a Schmitt trigger 14 previuosly described is utilized to produce a square wave pulse 15 previously described.

Of importance to the successful operation of this invention is the fact that all of the diodes 48a, 48b, etc. serve in electrically isolating the cells 7a, 7b, 7c, etc. from each other by preventing one cell from being applied as a load to another. As viewed in FIG. 2, the diodes are so connected as to prevent circuit current from flowing in a rightward direction. If the diodes were not present and a short circuit were considered as replacing the same, it will be noted that all of the cells would be connected as resistive loads on each other. This being true, the overall sensitivity expressed in the signal-to-noise ratio of the system would be quite low and for the most part unusable. By providing a multiplicity of individual cells 7a, 7b, 7c, etc., series-connected individually with diodes 48a, 48b, 48c, etc., any given cell is not deleteriously loaded by the remaining ones. Thus, for a given area of photocell surface, a greater signal-to-noise ratio can be obtained by dividing the same into smaller areas or cells and connecting them as shown in FIG. 2. Thus, a multiplicity of cells optically isolated by baffles provides an overall system sensitivity of usable, optimum value.

As explained previously, the cell-diode circuit of FIG. 2 is biased to the point at which the transistor 54 will be rendered substantially nonconductive. However, the biasing voltages applied to the cell, diode combinations as well as to the transistor 54 are such that the latter is on the verge of being rendered conductive in response to minimal radiation falling on one or more of the cells 7a, 7b, etc. This particular bias can be determined by means of the voltage divider 49, 50 or by means of a variable resistor.

In FIG. 13 is illustrated a schematic diagram of an operating circuit of this invention, this particular circuit being a detailed expansion of that shown in FIG. 2. Here again, like numerals will indicate like parts. The particular cell-diode combinations of FIG. 2 as enclosed in the dashed-line block 58 may be regarded as the center detectors or sensors represented in FIGS. 8 and 9 by the reference numeral 39. A similar group of cell-diode combinations, which are regarded as edge or flange detectors, are indicated by the block 59 of FIG. 2. The cells represented thereby are those indicated by the numeral 44 in FIG. 8. As shown more clearly in FIG. 13, within each of the detector blocks 58 and 59, the cell-diode combinations are broken down into a plurality of sections 60a, 60b, 60c, 60d, etc. and 61a, 61b, 61c, 61d, respectively, as shown, each section having its own transistor amplifier corresponding to the amplifier 54 previously described. The output circuits of the amplifiers corresponding to the amplifier 54 are connected through a coupling capacitor 62 to another amplifier 63 which in turn is connected to the Schmitt trigger 14 by coupling capacitor 57. The emitters 64a, 64b, 64c and 64d of the flange detector amplifiers, corresponding to the transistor amplifier 54 of the center detectors 58, are commonly connected to the input circuit of a single amplifier 65 having its output circuit also coupled to the Schmitt trigger 14 via the coupling capacitor 57 as shown.

The output signal 15 from the Schmitt trigger is coupled via a differentiating circuit 66 to the input circuit of a one-shot multi-vibrator 67, this latter circuit being adjusted to generate a single square-wave output pulse 68 of desired usable width and amplitude in response to each signal 15. This latter signal 68 is in turn fed to an output amplifier 69 for utilization by subsequent circuitry.

In the following are given the values and further description of the components of the circuit of FIG. 13, these being given by way of example only and not as limitations. As will appear obvious to persons skilled in the art, these components as well as certain of the circuitry may be varied without departing from the spirit and scope of this invention.

Photovoltaic cells 7, 39, 44
  (Silicon photovoltaic IRC-S 1020E6).
All diodes, unless otherwise specified _____ IN277
Resistor 49 _____ohms__ 1000
Diode 50 _____ IN458
Transistor 54 _____ 2N1132
All transistors, unless otherwise specified _____ 2N1132
Resistor 70 _____ohms__ 68
Capacitor 62 _____mfd___ 40
Transistors:
    63, 65 _____ 2N706
    69 _____ 2N697
Resistors:
    71 _____ohms__ 680
    72 _____do____ 1000
    73 _____do____ 10,000
    74 _____do____ 100
    75 _____do____ 1000
Capacitor 57 _____mfd___ 8
Resistors:
    76 _____ohms__ 680
    77 _____do____ 1000
    78 _____do____ 10,000
    79 _____do____ 100
    80 _____do____ 1000
    81 _____do____ 68
Capacitor 82 _____mfd___ 100
Resistors:
    83 _____ohms__ 10,000
    84 _____do____ 15,000
    85 _____do____ 20,000
Transistor 86 (U112 Field Effect Transistor).
Resistors:
    87 _____ohms__ 27,000
    88 _____do____ 10,000
    89 _____do____ 10,000
    90 _____do____ 470
    91 _____do____ 1000
Capacitor 92 _____mmfds__ 390
Resistors:
    93 _____ohms__ 22,000
    94 _____do____ 680
    95 _____do____ 12,000
Capacitor 96 _____mfd___ .22

Resistors:
    97 _____ohms__ 50,000
    98 _____do____ 56
    99 _____do____ 6,800
    100 _____do____ 12,000
Capacitor 101 _____mmfd__ 91
Resistors:
    102 _____ohms__ 12,000
    103 _____do____ 4700
    104 _____do____ 680
    105 _____do____ 4700
    106 _____do____ 2000
    107 _____do____ 4700
Capacitor 108 _____mfd___ 40
Transistor 109, 110 _____ 2N706

Recapitulating the operation, and keeping in mind the mechanical and electrical configurations of FIGS. 4, 5 and 13, the projector 23 scans the flange portion 32 of the headlight reflector, and if any cracks are present therein, one or more of the photocells of the flange detectors 59 will be excited and will thereby generate a signal which is amplified and triggers the Schmitt trigger 14 into operation as previously explained. Similarly, projector 24 will scan the underside of dome 31 in a circular pattern, such that if any cracks are present therein, light reflected therefrom will fall on one or more of the photocells in the center detectors 58. These in turn will generate a signal which is amplified and coupled to the Schmitt trigger 14, causing the latter to generate an output pulse 15 as previously explained. Thus, if a crack appears either in the center or flange portions 31, 32 of the headlight reflector, electrical signals representative thereof will be generated. As previously explained in connection with FIGS. 1 and 3, there will be certain spurious reflections which will produce background signals corresponding to those indicated by numeral 12. It will be noted that the amplitude of these signals is not as great as signal 13. Thus, it is desirable that the Schmitt trigger 14 be adjusted to respond only to signal 13 and not to the spurious or background signals 12. This threshold adjustment is achieved by means of the variable resistor 83 (FIG. 13) in the Schmitt trigger 14. Thus, the signal generated by Schmitt trigger 14 is free of all of the background hash 12 as exemplified by the curve (b) of FIG. 3.

What is claimed is:

1. Apparatus for the detection of cracks in articles of glass and the like comprising first means for producing a light beam and directing the same in a predetermined straight path which is at an angle other than normal with respect to the surface of the glass article, sensor means located in the proximity of but spaced from the direct said path for generating an electrical signal in response to light from said beam, a plurality of baffle plates interposed in said path adjacent said sensor means between said first means and said sensor means for interrupting said beam and preventing direct impingement thereof on said sensor means, said plates including a passage for light rays reflected at a predetermined angle to the axis of said light beam by a crack in said glass, said reflected angle being such that the last-mentioned light rays impinge said sensor means.

2. The apparatus of claim 1 including means for positioning an article of glass in the path of said beam between said first means and said baffle plates.

3. The apparatus of claim 2 wherein said positioning means is stationary and said first means is movable without disturbing the angle of said beam path with respect to said positioning means.

4. The apparatus of claim 1 wherein said baffle plates are arranged in an annular pattern, said baffle plates being spaced apart to provide for light-permeable passages therebetween, said baffle plates being generally flat and parallel to each other and having surfaces extending at an angle to said beam axis, said baffle plates overlapping as viewed from said first means thereby intercepting said beam and preventing the same from penetrating beyond said baffle plates, and said sensor means being positioned between said baffle plates on the side remote from said first means.

5. The apparatus of claim 4 wherein said sensor means include a multiplicity of electrically isolated photosensitive elements each capable of generating an electrical signal in response to impinging light.

6. The apparatus of claim 4 and including means for moving said first means in a circular pattern coaxial with the annular pattern of said baffle plates without disturbing the angulation between said beam axis and said baffle plates, and means for moving said first means rectilinearly toward and away from said baffle plates.

7. The apparatus of claim 4 and including a circular pattern of second baffle plates coaxially arranged inside the first-mentioned baffle plates, said second baffle plates being spaced apart and having surfaces which face said first means, a second light beam source on the side of said second baffle plates remote from said sensor means and directing a second light beam in a second predetermined straight path, the surfaces of said second baffle plates overlapping as viewed from said second source thereby preventing said second beam from penetrating beyond said second baffle plates, said second baffle plates having passageways for the transmission of reflected light therebetween, and said sensor means being positioned in alignment with said passageways on the side of said second baffle plates remote from said first means and said second beam source.

8. The apparatus of claim 7 wherein said first means is a first projection lamp and said second source is a second projection lamp, a first frame carrying said projection lamps, said frame being mounted for rotation about the axis of said annular pattern of baffle plates, said first projection lamp being positioned to direct the beam therefrom toward said first-mentioned baffle plates, said second projection lamp being positioned to direct the beam therefrom toward said second baffle-plates, a second frame carrying all said baffle plates, means for moving selectively said second frame toward and away from said first and second projection lamps, and said sensor means including a multiplicity of electrically isolated photosensitive elements each capable of generating an electrical signal in response to impinging light, there being at least one photosensitive element situated in the light passage between each adjacent pair of baffle plates.

9. The apparatus of claim 8 including means for positioning a glass article between said baffle plates and said projection lamps.

References Cited

UNITED STATES PATENTS

| | | | |
|---|---|---|---|
| 2,481,863 | 9/1949 | Owens | 88—14 |
| 2,735,017 | 2/1956 | Beard et al. | 250—52 |
| 3,067,872 | 12/1962 | Fouse et al. | 209—75 |
| 3,171,033 | 2/1965 | Mathias et al. | 250—224 |
| 3,302,786 | 2/1967 | Conrad | 209—111.5 |
| 3,327,849 | 6/1967 | Sorbie | 209—111.5 |

RALPH G. NILSON, Primary Examiner

C. M. LEEDOM, Assistant Examiner

U.S. Cl. X.R.

209—111.5; 250—223, 237; 356—239